United States Patent [19]

Hoffman et al.

[11] Patent Number: 4,690,988
[45] Date of Patent: Sep. 1, 1987

[54] POLYMER-MODIFIED VINYLIZED EPOXY RESINS

[75] Inventors: Dwight K. Hoffman, Midland, Mich.; Michael G. Stevens, Worthington, Ohio; Virginia B. Messick, Lake Jackson, Tex.

[73] Assignee: The Dow Chemical Company, Midland, Mich.

[21] Appl. No.: 693,411

[22] Filed: Jan. 22, 1985

[51] Int. Cl.$^4$ .................... C08G 8/30; C08L 63/10
[52] U.S. Cl. .................... 525/502; 525/530; 525/531
[58] Field of Search .................... 525/530, 531, 502

[56] References Cited

U.S. PATENT DOCUMENTS

| | | | |
|---|---|---|---|
| 4,098,841 | 7/1978 | Nagata et al. | 525/922 |
| 4,221,697 | 9/1980 | Osborn et al. | 525/530 |
| 4,221,892 | 9/1980 | Baron et al. | 525/530 |
| 4,426,243 | 1/1984 | Briggs | 525/531 |
| 4,444,923 | 4/1984 | McCarty | 525/112 |
| 4,446,258 | 5/1984 | Chu | 525/112 |

FOREIGN PATENT DOCUMENTS

| | | | |
|---|---|---|---|
| 45-15988 | 6/1970 | Japan | 525/531 |
| 46-12636 | 4/1971 | Japan | 525/531 |
| 55-18401 | 2/1980 | Japan | 525/530 |
| 57-148808 | 9/1982 | Japan | 525/531 |
| 58-198513 | 11/1983 | Japan | 525/531 |
| 60-106805 | 6/1985 | Japan | 525/531 |

*Primary Examiner*—John C. Bleutge
*Assistant Examiner*—Robert E. L. Sellers, II

[57] ABSTRACT

Vinylized epoxy resins, such as vinyl ester resins, comprise polymerizable ethylenic unsaturation and an in situ polymerized polymer, such as a polyalkyl acrylate. The vinylized epoxy resins can form stable dispersions and are useful in thermoset applications.

18 Claims, No Drawings

POLYMER-MODIFIED VINYLIZED EPOXY RESINS

BACKGROUND OF THE INVENTION

This invention relates to vinylized epoxy resins such as vinyl ester resins, and in particular, to vinylized epoxy resins which comprise polymerizates contained therein.

Vinylized epoxy resins such as vinyl ester resins comprise a well known class of thermosettable polymers. Such vinyl ester resins possess excellent physical and chemical properties, and are particularly useful as adhesives, in corrosion-resistant applications such as when formulated as fiber-reinforced plastic structures, as protective coatings for a variety of substrates, laminates, molding compositions, encapsulants, etc. Typical formulations comprising vinyl ester resins include plastic composite sheet molding compounds, resin transfer moldings and hand lay ups. For example, such resins are dissolved in a solvent or reactive diluent such as styrene, applied to a substrate, and cured.

Vinyl ester resins are typically prepared by reacting an unsaturated monocarboxylic acid with an epoxy resin such that a resin containing the characteristic vinyl ester moiety is provided. The physical properties of the vinyl ester resins will typically depend upon factors such as the epoxy reactants and the copolymerizable monomers which are employed, as well as the presence of various inert reinforcing agents such as glass fibers, carbon fibers, clays, etc.

Vinyl ester resins having improved impact resistances are disclosed in U.S. Pat. Nos. 3,674,893 and 3,892,819. These references disclose vinyl ester resins which are blended with unsaturated polydiene elastomers and are reacted or cured under conditions such that polydiene grafts are provided to the vinyl ester resins. While these references disclose compositions which exhibit excellent impact and mechanical properties, the heat distortion temperatures of such compositions is not as high as would be desirable.

In view of the deficiencies of the prior art it would be highly desirable to prepare vinyl ester resin compositions capable of exhibiting good mechanical properties, having high heat distortion temperatures, and providing cured products exhibiting reduced shrinkage and improved surface appearance.

SUMMARY OF THE INVENTION

The present invention is a vinylized epoxy resin, which vinylized epoxy resin comprises polymerizable ethylenic unsaturation and an in situ polymerized polymer.

In another aspect, the present invention is a stable dispersion of an in situ polymerized polymer and optional dispersion stabilizer in a vinylized epoxy resin continuous phase resulting from the vinylization of epoxy resin continuous phase of a stable dispersion of said polymer and optional dispersion stabilizer in an epoxy resin as a continuous phase.

The dispersions of polymer and dispersion stabilizer in the polyepoxide continuous phase can be made by (I)(a)(1) providing an adduct by reacting a minor amount of functional monomer with a polyepoxide continuous phase (2) providing a dispersion stabilizer by reacting the adduct with at least one monomer, and (3) polymerizing said monomer(s) in the polyepoxide continuous phase and in the presence of said dispersion stabilizer; or (b)(1) providing an adduct by reacting a minor amount of functional monomer with a polyepoxide continuous phase (2) providing a dispersion stabilizer by reacting the adduct with at least one monomer, while simultaneously polymerizing said monomer(s) in the polyepoxide continuous phase and in the presence of said dispersion stabilizer; and (II) vinylizing the polyepoxide.

As used herein the term "stable" is meant to refer to dispersions which remain substantially constant (i.e., do not undergo flocculate or dissolve) under conditions of preparation as well as conditions of thermal cure. For example, the dispersion of polymer remains stable (e.g., insoluble) under normal preparation, handling and processing (e.g., curing) conditions by maintaining a substantially constant morphology (e.g., size and distribution) in the continuous phase at some temperature normally some temperature above 60° C. Stable dispersions are, for example, those dispersions in which the polymer dispersed phase is insoluble in the continuous phase. Insolubility can be qualitatively identified by a cloudiness of the composition to visible observation.

As used herein, the term "in situ polymerized polymer" is meant to refer to a polymer which is polymerized in said epoxy resin prior to the vinylization of the epoxy resin. Such in situ polymerized polymers are referred to as polymerizates.

The compositions of this invention which can comprise vinyl ester groups can be described as polymer-modified vinyl ester resins. The compositions are useful in a wide variety of high performance engineering thermoset applications in which good mechanical properties and high heat distortion temperatures are required. Such compositions can be cured to provide compositions useful in a wide variety of applications such as fiber reinforced laminates; composites such as in fiberglass reinforced plastics and in glass reinforced plastic pipe; casting and molding resins; adhesives; encapsulants; coatings such as radiation curable coatings; and the like.

DETAILED DESCRIPTION OF THE INVENTION

The vinyl ester resin compositions of this invention are typically prepared by reacting an unsaturated carboxylic acid with an epoxy compound, which epoxy compound contains a polymerizate therein. Also included as compositions of this invention are the types of compounds prepared by reacting a compound such as acrylamide with an epoxy compound, which epoxy compound contains a polymerizate therein.

Epoxy compounds useful in this invention include a wide variety of epoxy compounds. Typically, the epoxy compounds are epoxy resins which are also referred to as polyepoxides. Polyepoxides useful herein can be monomeric (i.e., the diglycidyl ether of bisphenol A), advanced higher molecular weight resins, or polymerized unsaturated monoepoxides (e.g., glycidyl acrylates, glycidyl methacrylate, allyl glycidyl ether, etc.) to homopolymers or copolymers. Most desirably, epoxy compounds contain, on the average, at least one pendant or terminal 1,2-epoxy group (i.e., vicinal epoxy group) per molecule.

Examples of useful polyepoxides include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized diunsaturated acid esters, epoxidized unsaturated polyesters, and mixtures thereof. Numerous polyepoxides prepared from polyhydric phenols include those which are disclosed, for example, in U.S. Pat. No. 4,431,782. Polyepoxides can be prepared from mono-, di- and tri-hydric phenols, and can include the novolac resins. Polyepoxides can include the epoxidized cycloolefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, *Handbook of Epoxy Resins,* Chapter 2, McGraw Hill, New York (1967).

While the invention is applicable to polyepoxides, generally preferred polyepoxides are glycidyl polyethers of polyhydric alcohols or polyhydric phenols having weights per epoxide group of 150 to 2,000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

The polyepoxide may also include a minor amount of a monoepoxide, such as butyl glycidyl ether, phenyl glycidyl ether, or cresyl glycidyl ether, as a reactive diluent. Such reactive diluents are commonly added to polyepoxide formulations to reduce the working viscosity thereof, and to give better wetting to the formulation. As is known in the art, a monoepoxide affects the stoichiometry of the polyepoxide formulation and adjustments are made in the amount of curing agent and other parameters to reflect that change.

Polymerizates which are contained in the epoxy compound are typically organic polymers which are most desirably polymerizates of at least one ethylenically unsaturated monomer. Vinyl monomers useful herein are those which polymerize in situ in the polyepoxy continuous phase and provide polymers which form stable dispersions in the continuous phase. Combinations of monomers can be employed and polymerized in order to provide a stable dispersion in the epoxy resin as defined hereinbefore. Examples of vinyl monomers which may be employed include butadiene, isoprene, 1,4-pentadiene, 6-hexadiene, 1,7-octadiene, styrene, $\alpha$-methylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as chlorostyrene, 2,5-dichlorostyrene, bromostyrene, fluorostyrene, trifluoro-methylstyrene, iodostyrene, cyanostyrene, nitrostyrene, N,N-dimethylaminostyrene, acetoxystyrene, methyl-4-vinyl-benzoate, phenoxystyrene, p-vinyl diphenyl sulfide, p-vinylphenyl phenyl oxide, and the like; substituted acrylic monomers such as acrylonitrile, methyl methacrylate, butyl acrylate, cyclohexyl methacrylate, benzyl methacrylate, isopropyl methacrylate, octyl methacrylate, methacrylonitrile, methyl $\alpha$-chloroacrylate, ethyl $\alpha$-ethoxyacrylate, methyl $\alpha$-acetaminoacrylate, butyl acrylate, ethyl acrylate, 2-ethylhexylacrylate, phenyl acrylate, phenyl methacrylate, $\alpha$-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl butyrate, isopropenyl acetate, vinyl formate, vinyl methoxy acetate, vinyl benzoate, vinyl iodide, vinyl toluene, vinyl naphthalene, vinyl bromide, vinyl chloride, vinyl fluoride, vinylidene bromide, vinylidene chloride, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy,2'-vinyloxy diethyl ether, vinyl 2-ethylmercaptoethyl ether, vinyl methyl ketone, vinyl ethyl ketone, vinyl phosphonates such as bis($\beta$-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, monomethyl itaconate, t-butylaminoethyl methacrylate, dimethylaminoethyl methacrylate, allyl alcohol, dichlorobutadiene, vinyl pyridine and the like. Any of the known polymerizable monomers can be used and the compounds listed above are illustrative and not restrictive of the monomers suitable for use in this invention.

Preferably, the monomer which is employed forms a soft polymer measured as a glass transition temperature below use temperature. Representative monomers are the alkyl esters of acrylic and methacrylic acids, preferably wherein the alkyl group contains at least 4 carbon atoms, more preferably greater than 4 carbon atoms, and most preferably greater than 4 to about 24 carbon atoms. A monomer such as 2-ethylhexyl acrylate is preferred. Other representative monomers are the dienes such as butadiene and isoprene. Copolymers of such monomers with other comonomers can also be used. For example, styrene and butadiene form a well-known class of elastomers. Most preferred are the monomers forming elastomers.

Although monomers forming polymers having high softening temperatures can be used, the polymers have less beneficial influence on the toughness of the cured dispersions. Such polymers can be employed as might be desired, for example, as pigments, fillers, low profile agents for providing reduced shrinkage and improved surface appearance, etc. Generally, it is desirable to employ a stabilizer. However, compositions within the present invention can be formed with hard polymers having a glass transition temperature or crystalline melting point above the polymerization temperature of the polymer and cure temperature of the polyepoxide without the presence of a stabilizer, e.g., polyacrylonitrile.

A functional monomer having a reactive group in addition to a polymerizable vinyl functionality can be incorporated in a small amount in the monomer mixture which polymerizes to form the dispersed phase. Illustrative of functional monomers are acrylic acid, methacrylic acid, crotonic acid, itaconic acid, 2-hydroxyethyl or propylacrylate, 2-hydroxyethyl methacrylate, t-butylaminoethyl methacrylate, $\beta$-isocyanatoethyl methacrylate, glycidyl acrylate, glycidyl methacrylate, glycol monoesters of itaconic acid, methyl monoester of itaconic acid, acrylamide or substituted acrylamides, allyl alcohol, maleic acid, fumaric acid, isopropenyl phenol, and the like. Such monomers can provide sites for subsequent crosslinking or for bonding to the polyepoxide continuous phase matrix.

In addition, monomers containing more than one vinyl group can be used at low levels to increase the molecular weight of the dispersed phase. Examples of such comonomers are the polyvinyl monomers, such as divinylbenzene, allyl methacrylate, ethylene glycol dimethacrylate, and the like.

The vinyl polymerization is induced and maintained by conventional free radical catalysts and elevated temperatures. The concentration of the catalyst can vary from about 0.001 to about 10 percent, preferably from about 0.2 to about 1.0 percent; however, any effective catalytic amount is satisfactory. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditri-phenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, alpha,alpha'-azo-2-methyl butyronitrile, alpha,alpha'-2-methyl heptonitrile, 1,1'-azo-1-cyclohexane carbonitrile, dimethyl, alpha,alpha'-azoisobutyrate, 4,4'-azo-4-cyanopentanoic acid, azobisisobutyronitrile, persuccinic acid, diisopropyl peroxy dicarbonate, and the like; a mixture of catalysts can also be used.

The vinyl polymerization can also be carried out with an inert organic solvent present. Illustrative thereof are toluene, benzene, o-xylene, acetonitrile, ethyl acetate, hexane, heptane, dicyclohexane, dioxane, acetone, N,N-dimethylformamide, N,N-dimethylacetamide, halogenated solvents and the like, including those known in the art as being suitable solvents for the polymerization of vinyl monomers. The only requirement in the selection of the inert solvent is that it does not substantially interfere with the monomer's polymerization reaction. Any solvent, if used, can be removed before further conversion of the polymerization product to a vinyl ester compound. However, it is preferable to remove the solvent before dilution with a reactive diluent.

The vinyl polymerization system can also contain small amounts of from about 0.1 to 2 percent by weight of a chain transfer agent based on the weight of vinyl monomer in the dispersed phase. Alkyl mercaptans having from one to twenty carbon atoms in the alkyl chain may be employed in the present invention. Representative mercaptans include ethyl mercaptan, propyl mercaptan, butyl mercaptan, hexyl mercaptan, octyl mercaptan, decyl mercaptan, dodecyl mercaptan, tetradecyl mercaptan, cetyl mercaptan, stearyl mercaptan. Other chain transfer agents such as disulfides and halogenated compounds, especially brominated compounds, can be used.

Dispersion stabilizers are employed in the process of this invention in order to prepare a dispersion more esily and also to provide dispersions having superior stability. A dispersion stabilizer is any molecule which contains at least two different segments, blocks or functionalities, one of which is compatible with the polyepoxide and one of which is compatible with the polymer particles of the dispersed phase. See, for example, *Dispersion Polymerization in Organic Media*, edited by K. E. J. Barrett, John Wiley and Sons, London (1975).

Reactive functional monomers useful in preparing dispersion stabilizers of this invention can be described as those monomers having a functionality capable of undergoing a polymerization reaction with the monomers forming the dispersed phase (e.g., a vinyl functionality) and a functionality capable of reacting or coupling with a reactive moiety of an epoxy compound (e.g., an epoxy functionality). The reaction product of a reactive functional monomer and an epoxy resin to form a new product having vinyl unsaturation can be called a vinylized adduct. Vinylized adducts are typically prepared by reacting an oxirane moiety of a polyepoxide with an ethylenically unsaturated functional monomer such as those described hereinbefore. Reactivity of monomers, process conditions for reaction and other reaction parameters are disclosed in Lee and Neville, *Handbook of Epoxy Resins*, McGraw Hill, New York (1967) at Appendix 5-1 and the bibliography in Chapter 5, pages 39-40. Catalysts useful in preparing reactive functional monomers from, for example, polyepoxides and unsaturated carboxylic acids include the ethyl triphenyl phosphonium acetate, acetic acid complex and other onium compounds; tertiary amines such as tris(dimethylaminoethyl) phenol; triphenyl phosphine; metal salts such as chronium chloride and chronium acetate; and other catalysts which catalyze the epoxy/carboxy reaction. If desired it is possible to incorporate a polymerization inhibitor into the reaction mixture in order to prevent premature vinyl polymerization of the ethylenically unsaturated moieties prior to the completion of the epoxy/carboxy reaction. Examples of such inhibitors include 2,6-di-tertiary-butyl-4-methylphenol, p-methoxyphenol, hydroquinone and tetrahydrothiazine. Such inhibitors can be additionally employed for improved storage of the reactive functional monomer.

The dispersion stabilizer can be prepared using a variety of techniques. For example, the dispersion stabilizer can be prepared in situ early in the preparation of the dispersion by reacting a functional monomer (e.g., acrylic acid) with the epoxy compound in the presence of a suitable catalyst. The resulting epoxy compound having reactive functional groups (e.g., ethylenically unsaturated moieties) can be further reacted with the other monomers which polymerize to form the dispersed phase. Alternatively, for example, the dispersion stabilizer can be prepared separately and added to the epoxy compound before or during addition and polymerization of the monomers which polymerize to form the dispersed phase.

The process of this invention in one aspect provides a means for the skilled artisan to prepare stable dispersions of a polymer in a polyepoxide continuous phase, in which the polymers are dispersed as particles which are formed before curing. The polymers which form the dispersed phase can comprise the polymerization product of one or more monomers (e.g., form a copolymer). The polymerization reaction can be a step reaction such as in the preparation of condensation polymers, or an addition polymerization such as in the polymerization of ethylenically unsaturated monomers. The addition polymerization can be cationic, anionic or coordination polymerization; or free-radical chain addition. Generally preferred is the free-radical chain addition. Most preferred is the free-radical polymerization of one or more ethylenically unsaturated monomers.

Stable dispersions of polymers in the polyepoxide are those dispersions which remain stable at a temperature preferably above about 60° C., preferably above about 90° C. For example, the polymer which forms the stable dispersed phase is one which is insoluble in the polyepoxide continuous phase at some temperature above 60° C., preferably at some temperature above about 90° C. Thus, for purposes of this invention the term "good stability" is referring to the dispersions of this invention can mean that (a) the particles do not coagulate or coalesce to an appreciable degree prior to use or during the curing process; (b) the particles have a controlled particle size; (c) the dispersions can be stored for reasonable periods without premature curing; and (d) the particles maintain a size and dispersion distribution which remains substantially unchanged during storing and processing.

Because this invention in one aspect concerns the use of stable dispersions of polymers in a polyepoxide continuous phase, it is understood that the stability of the dispersion depends upon the appropriate combination of polymerizate and epoxy resin. If the polymerization product of a particular monomer or monomers which form the desired dispersed phase in the polyepoxide forms an unstable dispersion it is possible that the desired results can be obtained with the same monomer or monomers in a different polyepoxide. The stability can be improved in order to provide a dispersion which remains stable in the polyepoxide as per the definition of this invention by employing a particular polyepoxide, a particular dispersed phase polymer, a combination of a particular polyepoxide and a particular dispersed phase polymer, a dispersion stabilizer, or a change in the polymerization process.

Compositions of this invention are prepared by reacting the epoxy compound containing the polymerizate with a functional monomer in order to provide a reaction product of the epoxy resin with the functional monomer such that a compound containing vinyl unsaturation is obtained.

In order to form the vinyl ester resins, the polyepoxides containing the polymerizates are typically reacted with ethylenically unsaturated acids. The unsaturated acids employed herein in forming the vinyl ester group are protonic acids preferably having a dissociation constant of at least about $1 \times 10^{-7}$, most preferably at least $1 \times 10^{-5}$. Such acids are normally organic carboxylic acids and are more preferably monocarboxylic acids. Suitable acids include, for example, acrylic acid, methacrylic acid, maleic acid, itaconic acid, cinnanic acid, longer chain acids such as oleic acid, linoleic acid, tall oil acid and dimer acids, and the half esters of hydroxy alkyl acrylates and methacrylates formed, for example, by reacting 2-hydroxyethyl acrylate with phthalic anhydride, maleic anhydride, succinic anhydride and the like. Acrylic acid and methacrylic acid are the most preferred monocarboxylic acids. Mixtures of saturated acids and the acids bearing polymerizable vinyl groups can also be used, for example, as a means of limiting the vinyl functionality of the product. Mixtures of saturated acids and the acids bearing polymerizable vinyl groups can also be used. Mixtures of this type represent a means of limiting the vinyl functionality of the product, etc.

The dispersion is converted to a vinyl ester resin composition by contacting the modified polyepoxide with the unsaturated acid and subjecting the mixture to conditions such that vinyl ester functionalities are formed.

Typically, the equivalent amount of unsaturated carboxylic acid per epoxy group ranges from about 0.1 to about 1.2, preferably from about 0.25 to about 1.1, most preferably about 1.

Numerous factors affect the stability or insolubility of the dispersed polymer in the vinyl ester resin continuous phase. For example, vinyl ester resins having greater viscosities provide greater stability to the polymers of the dispersed phase. Dispersed polymer particles of smaller particle size generally have greater stability than larger size particles. A small difference in density between the dispersed and continuous phases generally provides a composition having greater dispersion stability than a composition having a large difference in density between the components of the aforementioned phases. Particles having less tendency to agglomerate provide compositions which have greater stability than those compositions which contain components which have a greater tendency to agglomerate. Thus, by altering the types of components which are employed in preparing the composition of this invention, it is possible to control factors such as the coagulation or coalescence of the dispersed phase in the continuous phase. It is understood that the presence of a dispersion stabilizer or the absence of undesirable flocculants in the composition can also control the amount of undesirable coagulation or coalescence of the dispersed phase in the continuous phase which occurs.

The polymerizate which forms the dispersed phase can be in an amount of from 5 to 70 volume percent, preferably 5 to 50 percent of the total dispersion. The optimum concentration of vinyl polymer phase can and will be varied depending upon the materials employed and the end use that is envisaged. The dispersions are usually made at a solids level at which the dispersions are to be used. However, it is possible to prepare higher solids dispersions and dilute to the final solids level.

The properties of the dispersion are influenced by a variety of factors including the identity of the components, the particle size and concentration of the dispersed phase, the hardness or softness of the particles of the disperse phase, the concentration of the dispersion stabilizer and many other factors. For many applications it is most desirable to employ a dispersed phase polymer having a solution temperature above the polymerization temperature of said polymer.

For most practical applications, the stability of the dispersion and the property enhancement due to the disperse phase polymerizate will be optimized with particles that are less than some critical particle size which is about 20 microns.

The aforementioned vinyl ester resins can be copolymerized with vinyl-functional chain extending monomers which act as flexibilizers or modifiers to the vinyl ester resin polymer. Suitable monomers include vinyl aromatic compounds such as styrene, vinyltoluene, divinylbenzene, t-butylstyrene, chlorostyrenes, vinylbenzylchloride, and the like; esters of acrylic acid or methacrylic acid such as 2-ethylhexyl acrylate, butyl acrylate, trimethylolpropane trimethacrylate, 1,3-butylene glycol dimethacrylate, methyl methacrylate, ethyl acrylate, hydroxy alkyl acrylates and methacrylates and the like; diallyl maleate, dimethallyl fumarate and nitrogen-containing monomers such as t-butylaminoethyl methacrylate, N,N'-dimethylaminoethyl acrylate, N,N-diethylaminoethyl methacrylate, N,N'-dimethylaminoethyl methacrylate, N-vinylpyrrolidone, 2-N-morpholinoethyl acrylate; diallylpthalate; and mixtures thereof. Essentially any other monomer which is capable of copolymerizing with the vinyl ester resin can be used.

It is understood that the vinyl-functional chain extending monomers are optionally employed, and when employed are so used in amounts to achieve the desired polymeric properties. The vinyl ester resin generally comprises from about 20 to about 100, preferably from about 50 to about 100, weight percent of the vinyl ester resin polymer, while the vinyl-functional chain extending monomer comprises from about 0 to about 80, preferably from about 0 to about 50 weight percent of said vinyl ester resin polymer.

The dispersions are solidified by curing the vinyl ester resin. In the curing of vinyl ester resin the choice of curing agent can influence the cure rate, the exotherm and resultant properties of the finished product. The curing agents or initiators most commonly used to effect crosslinking or cure of vinyl ester resins are organic peroxides or hydroperoxides. Decomposition of these initiators can be effected by heat or by the use of accelerators or promoters which cause a more rapid decomposition of the initiator at a given temperature. The accelerators most commonly employed are the tertiary amines and the metalic soaps, such as cobalt or manganese octoate or naphthenate. See, Paul F. Bruins, ed., "Unsaturated Polyester Technology", Gordon and Breach Science Publishers, New York, 1976, p. 329.

The following examples are given to illustrate the invention but should not be construed as limiting the scope thereof.

EXAMPLE 1

A vinyl polymer/epoxy resin polymerizate is prepared as follows: 1,000 g of a diglycidyl ether of bisphenol-A (a liquid epoxy resin sold commercially by The Dow Chemical Company as D.E.R. ® 383 epoxy resin, having an epoxy equivalent weight of from 178 to 186 and a viscosity at 25° C. of between 9,000 and 11,500 centipoise) is charged into a five-neck, two-liter round bottom flask equipped with a dual syringe pump for vinyl monomer addition, means for initiator addition, stirring means, condenser, thermometer and nitrogen/air sparge. The epoxy resin is heated to 80° C. with stirring at which point 8 g of methacrylic acid is added (continuously), followed by the addition of 0.01 hydroquinone (inhibitor) and with 0.25 g of a 70 percent solution of ethyltriphenyl phosphonium acetate-acetic acid complex in methanol. This mixture is heated to 115° C. with air sparge over a 15 minute period and held at this temperature for 30 minutes. To the resulting precursor mixture is added a monomer mixture of 112.5 g 2-ethylhexyl acrylate and 37.5 g glycidyl methacrylate over a 35 minute period with nitrogen sparge. A further monomer mixture of 75 g 2-ethylhexylacrylate and 7 g glycidyl methacrylate is added over a 25 minute period. Over the one hour period that the two monomer mixtures are added 2.8 g of tertiarybutyl perbenzoate catalyst is added to the precursor mixture. The total mixture is reacted at 115° C. for an additional four hours, and the mixture is further heated to 145° C. for 15 minutes. The resulting product is a viscous, white dispersion.

The product is treated as follows: The product (48.33 percent of the reactant mixture) is heated to 90° C. in the previously described flask with agitation under air sparge. To the flask is charged 209 ppm hydroquinone, methacrylic acid (16.52 percent of reactant mixture), and a 0.33 percent active hydrated chromium chloride catalyst formulation (0.06 percent of reactant mixture). The mixture is heated to 115° C. The mixture is tested to determine the amount of free acid present. At 1 to 1.2 percent acid, oxalic acid (0.03 percent of reactant mixture) is charged to the mixture. After 5 minutes, to the mixture is charged styrene (17.5 percent of reactant mixture). When the mixture cools to about 90° C. or less, to the mixture is charged 4-chloro-2-nitrophenol (inhibitor) (0.01 percent of reactant mixture), phenothiazine (inhibitor) (0.02 percent of reactant mixture) and styrene (17.5 percent of reactant mixture) as taught in U.S. Pat. No. 4,407,991 and 4,413,105. The mixture is cooled with air sparge to less than 40° C. and the vinyl ester resin product is removed from the reactor. The product contains 9.67 percent rubber polymerized therein.

Castings are prepared by curing the resin product with 0.3 percent of cobalt naphthenate solution (6 percent active cobalt in a mineral spirits solution) and 1.22 percent of methyl ethyl ketone peroxide solution (50 percent methylethyl ketone peroxide in dimethyl phthalate). The resin is cured at ambient temperature for about 16 hours and post-cured for 2 hours at 311° F. This sample is designated as Sample No. 1.

In a similar manner are prepared castings of vinyl ester resin products containing 40 percent styrene, 45 percent styrene and 30 percent styrene polymerized therein. These samples are designated as Sample Nos. 2, 3 and 4 respectively. For comparison purposes are prepared vinyl ester resin products containing 35, 40 45 and 30 percent styrene, but prepared from the epoxy resin and not from the rubber-modified epoxy resin. These samples are designated as Sample Nos. C-1, C-2 C-3 and C-4 respectively.

Data concerning the physical properties of the various samples are presented in Table I.

TABLE I

| Sample | Percent[1] Rubber | Tensile[2] (psi) | Tensile[3] Modulus | Percent[4] Elongation | Flexural[5] (psi) | Flexural[6] Modulus | HDT[7] (°F.) | Barcol[8] |
|---|---|---|---|---|---|---|---|---|
| 1 | 9.67 | 9,730 | 3.40 | 4.47 | 17,760 | 4.58 | 206 | 39 |
| 2 | 8.93 | 9,890 | 3.33 | 5.20 | 20,790 | 5.57 | 212 | 42 |
| 3 | 8.18 | 9,440 | 3.37 | 4.46 | 18,840 | 4.13 | 208 | 41 |
| 4 | 10.33 | 8,558 | 3.69 | 4.07 | 12,435 | 3.52 | 211 | 36 |
| C-1* | — | 7,030 | 4.11 | 1.87 | 17,568 | 5.66 | 261 | 43 |
| C-2* | — | 9,080 | 3.91 | 2.70 | 22,800 | 5.61 | 263 | 42 |
| C-3* | — | 7,520 | 3.95 | 2.14 | 17,050 | 5.48 | 257 | 41 |

TABLE I-continued

| Sample | Percent[1] Rubber | Tensile[2] (psi) | Tensile[3] Modulus | Percent[4] Elongation | Flexural[5] (psi) | Flexural[6] Modulus | HDT[7] (°F.) | Barcol[8] |
|---|---|---|---|---|---|---|---|---|
| C-4* | — | 10,301 | 4.99 | 2.55 | 24,562 | 5.63 | 265 | 45 |

*Not an example of the invention.
[1]Percent Rubber is based on the weight of vinyl ester resin plus styrene.
[2]See ASTM D-638-82A.
[3]See ASTM D-638-82A. Reported in psi × $10^5$.
[4]See ASTM D-638-82.
[5]See ASTM D-790-81.
[6]See ASTM D-790-81. Reported in psi × $10^5$.
[7]See ASTM D-648-82.
[8]See ASTM D-2583-81.

The data in Table I indicate that improved elongation is obtained by the samples of this invention, which samples containing the dispersed acrylic elastomer.

EXAMPLE 2

A vinyl polymer/epoxy resin polymerizate is prepared as follows: 6,218.2 g of the epoxy resin described in Example 1 is charged into a system as described in Example 1. The resin is heated to 80° C. and 48.82 g of methacrylic acid and 3.11 g of ethyl triphenyl phosphonium acetate-acetic acid complex (catalyst) are charged into the system. The mixture is heated to 115° C. for 30 minutes followed by heating to 120° C. with nitrogen sparge. A monomer mixture containing 1,557 g 2-ethylhexyl acrylate and 149.3 g methacrylic acid is added to the flask containing the resin over a 1 hour period. Simultaneously is added an initiator solution containing 7.79 azobisisobutyronitrile in 194.6 g toluene, but over a 2 hour period. Following addition of monomer and initator, the system is subjected to reaction conditions for an additional 30 minutes. Following completion of the reaction, the toluene is stripped under vacuum conditions. The product is a viscous, white dispersion.

In a manner described in Example 1 is prepared a vinyl ester resin and vinyl ester resin products by polymerizing styrene therewith. Sample Nos. 5 and 6 contain vinyl ester resin polymerized with 40 percent styrene and 45 percent styrene, respectively.

Data concerning the physical properties of the various samples are presented in Table II.

is heated to 115° C. with air sparge over a 15 minute period and held at this temperature for 30 minutes. The mixture is heated to 130° C. with a nitrogen sparge and a mixture of 150 g 2-ethylhexyl acrylate and 24.2 g glycidyl methacrylate is added thereto over a 35 minute period. To the mixture is then added a mixture of 100 g 2-ethylhexyl acrylate, 161.3 g glycidyl methacrylate and 1.25 g trimethyolpropane triacrylate over a 25 minute period. Simultaneously to the additions of the monomer mixtures is added 4.4 g of tertiary butyl peroxybenzoate catalyst but over a 2 hour period. The mixture is then reacted for an additional hour. The final product is a viscous, white dispersion.

The product is treated as follows: The product (51.37 percent of the reactant mixture) is heated to 90° C. in the previously described flask with agitation under air sparge. To the mixture is added hydroquinone (0.03 percent of the reactant mixture), methacrylic acid (18.46 percent of the reactant mixture) and 0.33 percent active hydrated chromium chloride catalyst formulation (0.06 percent of reactant mixture). The mixture is heated to 115° C. The mixture is tested to determine the amount of free acid present. At 1 to 1.2 percent acid, oxalic acid (0.02 percent of reactant mixture) is charged to the mixture. After 5 minutes, to the mixture is charged styrene (15 percent of reactant mixture). When the mixture cools to below about 90° C., to the mixture is charged styrene (15 percent of reactant mixture) and phenothiazine (0.03 percent of reactant mixture). The mixture is cooled to less than 40° C. with air sparge

TABLE II

| Sample | Percent[1] Rubber | Tensile[2] (psi) | Tensile[3] Modulus | Percent[4] Elongation | Flexural[5] (psi) | Flexural[6] Modulus | HDT[7] (°F.) | Barcol[8] |
|---|---|---|---|---|---|---|---|---|
| 5 | 8.61 | 9,152 | 4.42 | 2.54 | 20,598 | 5.26 | 233 | 42 |
| 6 | 7.90 | 9,337 | 4.42 | 2.55 | — | — | 218 | 42 |

For Footnotes [1] through [8] see corresponding Footnotes at Table 1.

EXAMPLE 3

A vinyl polymer/epoxy resin polymerizate is prepared as follows: 1,000 g of a diglycidyl ether of a novolac of phenol and formaldehyde having an average number of phenols and thus an oxirane functionality of 3.6; an epoxide equivalent weight of from 175 to 182 and a viscosity at 25° C. of between 30,000 and 90,000 centipoises, and sold commercially as D.E.N. ®438 epoxy novolac by The Dow Chemical Company is charged into a system as described in Example 1. The resin is heated to 80° C. with stirring and 8 g of methacrylic acid followed by 0.01 g of hydroquinone and 0.25 g of ethyl triphenyl phosphonium acetate-acetic acid complex are charged into the system. The mixture before removing the vinyl ester resin from the reactor. The product contains 10.27 percent rubber polymerized therein. Castings are prepared by curing the product as described in Example 1. This sample is designated as Sample No. 7.

In a similar manner are prepared castings of a vinyl ester resin product containing 35 percent styrene polymerized therein. The sample is designated as Sample No. 8. For comparison purposes are prepared vinyl ester resin products containing 30 and 36 percent styrene, but prepared from the epoxy resin and not from the rubber-modified epoxy resin. These samples are designated as Sample Nos. C-5 and C-6, respectively.

Data concerning the physical properties of the various samples are presented in Table No. III.

TABLE III

| Sample | Percent[1] Rubber | Tensile[2] (psi) | Tensile[3] Modulus | Percent[4] Elongation | Flexural[5] (psi) | Flexural[6] Modulus | HDT[7] (°F.) | Barcol[8] |
| --- | --- | --- | --- | --- | --- | --- | --- | --- |
| 7 | 10.27 | 8,101 | 3.71 | 3.31 | 15,670 | 4.61 | 268 | 38 |
| 8 | 9.54 | 8,161 | 4.03 | 2.98 | 16,299 | 4.59 | 266 | 36 |
| C-5* | — | 6,121 | 4.10 | 1.66 | 11,254 | 5.32 | 320 | — |
| C-6* | — | 10,060 | 5.93 | 2.25 | 19,865 | 6.15 | 291 | — |

*Not an example of the invention.
For Footnotes [1] through [8] see corresponding Footnotes of Table 1.

The data in Table III indicate that improved elongation is exhibited by the sample of this invention while high heat distortion temperatures are maintained.

EXAMPLE 4

A dispersion of poly-2-ethylhexyl acrylate in the epoxy resin described in Example 2 is prepared as described in Example 2. The product contains 18 percent rubber. This product (30.86 percent of the reaction mixture) is charged with bisphenol-A (7.13 percent of reaction mixture) in the system described in Example 1. This mixture is heated to 90° C., agitated, sparged with nitrogen and charged with tetrabutyl phosphonium acetate-acetic acid complex (0.03 percent of reaction mixture). The mixture is heated to 150° C. and allowed to react for 1.5 hours after the temperature of 150° C. is reached. The mixture is cooled to 120° C. and allowed to react for an additional hour. Under air sparge is charged hydroquinone, methacrylic acid and 0.33 percent active hydrated chromium chloride formulation (0.03, 15.85 and 0.07 percent of the reaction mixture, respectively) to the mixture. The mixture is heated to 115° C. When the free acid content of the mixture is 1–1.2 percent, the heating of the mixture is discontinued. To the mixture is charged oxalic acid (0.02 percent of reaction mixture). After 5 minutes styrene (15 percent of reaction mixture) is charged to the mixture. When the mixture cools to less than about 90° C., 4-chloro-2-nitrophenol, phenothiazine, and styrene (0.01, 0.015 and 15 percent of the reaction mixture, respectively) are charged to the mixture. The mixture is cooled to less than about 40° C. with air sparge before removing the vinyl ester resin from the reactor. Castings are prepared as described in Example 1. The sample is designated as Sample No. 9.

In a similar manner is prepared a casting of a vinyl ester resin product containing 35 percent styrene polymerized therein. This sample is designated as Sample No. 10.

For comparison purposes are prepared vinyl ester resin products containing 30 and 35 percent styrene polymerized therein, but prepared from the epoxy resin and not from the rubber-modified epoxy resin. These samples are designated as Sample Nos. C-7 and C-8, respectively.

For comparison purposes are prepared vinyl ester resin products containing 30 and 35 percent styrene polymerized therein, and amounts of carboxy-terminated butadiene/acrylonitrile polymers therein. These samples are designated as Sample Nos. C-9 and C-10, respectively.

Data concerning the physical properties of the various samples are presented in Table IV.

TABLE IV

| Sample | Percent[1] Rubber | Tensile[2] (psi) | Tensile[3] Modulus | Percent[4] Elongation | Flexural[5] (psi) | Flexural[6] Modulus | HDT[7] (°F.) |
| --- | --- | --- | --- | --- | --- | --- | --- |
| 9 | 6.17 | 9,171 | 4.09 | 2.87 | 17,403 | 4.56 | 244 |
| 10 | 5.73 | 11,066 | 4.31 | 4.46 | 19,735 | 4.77 | 246 |
| C-7* | — | 8,278 | 4.34 | 2.19 | 13,281 | 5.63 | 254 |
| C-8* | — | 9,461 | 5.33 | 2.15 | 13,372 | 5.80 | 255 |
| C-9* | 7.65 | 11,050 | 4.33 | 3.94 | 21,624 | 5.39 | 207 |
| C-10* | 7.06 | 11,386 | 4.40 | 4.88 | 20,467 | 5.39 | 208 |

*Not an example of the invention.
For Footnotes [1] through [7] see corresponding Footnotes at Table 1.

The data in Table IV indicate that the sample of this invention exhibits a higher heat distortion temperature over a sample containing a carboxy-terminated butadiene acrylonitrile polymer.

EXAMPLE 5

A vinyl polymer/epoxy resin polymerizate is prepared as follows: 1,600 g of a triglycidyl ether of tri(p-hydroxy) phenyl methane (a semi-solid epoxy resin sold commercially by The Dow Chemical Company as XD-7342.00 epoxy resin) is charged into a three-liter, three-necked flask equipped with addition funnel, stirrer, thermocouple, condenser and nitrogen/air sparge. The epoxy resin is heated to 100° C. with stirring at which point 15 g methacrylic acid is added (continuously), followed by the addition of 1 g of a 70 percent solution of ethyltriphenyl phosphonium acetate-acetic acid complex in methanol. The mixture is held at 100° C. for an additional hour and then heated to 150° C. At this time, a solution of 500 g 2-ethylhexyl acrylate and 5 g of a commercially available 2-tertiary-butylazo-2-cyanobutane initiator is added over a one hour period. After heating for an additional 30 minutes at 150° C., the volatiles are removed under vacuum (at less than 1 mm Hg). The resulting product is a yellow, semi-solid dispersion having 18 percent solids and 20–45 percent epoxide.

The product is treated as follows: The product (50.00 percent of the reactant mixture) is heated to 90° C. in the previously described flask of Example 1 with agitation under a nitrogen sparge. To the flask is added 0.0714 percent of a 70 percent solution of ethyltriphenyl phosphonium acetate-acetic acid complex in methanol (0.04 percent of the reactant mixture) and the temperature is raised to 120° C. and held for one hour. Then 400 ppm hydroquinone (0.03 percent of the reactant mixture) and methacrylic acid (19.82 percent of the reactant mixture and 97 percent stoichiometry based on epoxy content) are added with mixing. Under an air sparge, 33 percent active hydrated chromium (III) chloride catalyst formulation (0.06 percent of the reactant mixture) is added and the temperature is raised to 115° C. The mixture is tested to determine the amount of free acid present. At 1 to 1.2 percent acid, oxalic acid (0.02 percent of the reactant mixture) and styrene (15 percent of the reactant mixture) are added. The product temperature is reduced below 90° C. and 400 ppm phenothiazine (0.03 percent of the reactant mixture) and styrene (15 percent of the reactant mixture) are added.

Castings are prepared by curing as described in Example 1. The sample is designated as Sample No. 11.

In a similar manner, castings of a vinyl ester resin product containing 35 percent styrene are prepared therein. This sample is designated as Sample No. 12.

For comparison purposes are prepared vinyl ester resin products containing 30 and 35 percent styrene polymerized therein, but prepared from the epoxy resin and not from the rubber-modified epoxy resin. These samples are designated as Sample Nos. C-11 and C-12, respectively.

Data concerning the physical properties of the various samples are presented in Table V.

TABLE V

| Sample | Percent[1] Rubber | Tensile[2] (psi) | Tensile[3] Modulus | Percent[4] Elongation | Flexural[5] (psi) | Flexural[6] Modulus | HDT[7] (°F.) | $G_{1C}$[8] (KJ/m$^2$) |
|---|---|---|---|---|---|---|---|---|
| 11 | 9.00 | 6,834 | 3.37 | 2.99 | 14,196 | 4.22 | 276 | 0.15 |
| 12 | 8.36 | 6,929 | 3.36 | 3.21 | 14,353 | 4.37 | 297 | 0.17 |
| C-11* | — | 6,229 | 4.72 | 1.62 | 17,649 | 5.94 | 302 | 0.09 |
| C-12* | — | 7,998 | 4.95 | 1.79 | 18,434 | 5.95 | 310 | 0.07 |

*Not an example of the invention.
For Footnotes [1] through [7] see corresponding Footnotes at Table I.
[8]Surface fracture energy values ($G_{1C}$) are measured using a compact tension testing method as described by C. Y. C. Lee and W. B. Jones, Jr. in Poly. Eng. Sci., Vol. 22, p. 1190 (1982).

The data in Table V indicate that the sample of this invention exhibits improved elongation and surface fracture energy over an unmodified material.

What is claimed is:

1. A dispersion which comprises an uncured vinylized epoxy resin prepared from an uncured epoxy resin as a continuous phase having dispersed therein (i) an insoluble polymer and (ii) a dispersion stabilizer which is the polymerizate of at least one vinyl monomer and a vinylized epoxy resin adduct derived from the reaction product of an unsaturated carboxylic acid and a polyepoxide, said insoluble polymer having been polymerized in situ in the uncured epoxy resin and in the presence of the dispersion stabilizer, and the uncured epoxy resin subsequently vinylized by reacting the uncured epoxy resin with an ethylenically unsaturated acid; the insoluble polymer dispersed phase further characterized in that it forms an insoluble polymer dispersion in the uncured epoxy and remains a stable dispersion in the vinylized epoxy resin at a temperature above 60° C.

2. The vinylized epoxy resin of claim 1 wherein said in situ polymerized polymer is a polymerizate of at least one ethylenically unsaturated monomer.

3. The vinylized epoxy resin of claim 1 which is a vinyl ester resin.

4. The vinylized epoxy resin of claim 2 wherein said vinyl polymer is an alkyl ester of acrylic acid or methacrylic acid.

5. The vinylized epoxy resin of claim 1 wherein said epoxy resin is a liquid polyepoxide.

6. The vinylized epoxy resin of claim 5 wherein said liquid polyepoxide is a diglycidyl ether of bisphenol A.

7. The vinylized epoxy resin of claim 5 wherein said polyepoxide is a solid polyepoxide.

8. The vinylized epoxy resin of claim 5 wherein said polyepoxide is a halogenated polyepoxide.

9. The vinylized epoxy resin of claim 8 wherein said halogenated polyepoxide is a polyglycidyl ether of brominated bisphenol A.

10. The vinylized epoxy resin of claim 5 wherein said polyepoxide is an epoxy novolac.

11. The vinylized epoxy resin of claim 5 wherein said polyepoxide is tris(glycidylphenyl)methane.

12. The vinylized epoxy resin of claim 5 wherein said polyepoxide is tetraglycidyl ether of methylene dianiline.

13. The vinylized epoxy resin of claim 4 wherein said alkyl group comprises an alkyl group containing greater than 4 carbon atoms.

14. The vinylized epoxy resin of claim 13 wherein said alkyl acrylate is 2-ethylhexyl acrylate.

15. The vinylized epoxy resin of claim 1 wherein said reaction product is an acrylic or methacrylic acid ester of the diglycidyl ether of bisphenol A.

16. The vinylized epoxy resin of claim 1 wherein said reaction product is an ester of a diglycidyl ether of a halogenated bisphenol A.

17. The vinylized epoxy resin of claim 1 wherein said reaction product is an ester of a polyglycidyl ether of a novolac.

18. The vinylized epoxy resin of claim 1 wherein said reaction product is an ester of tris(glycidylphenyl)methane.

* * * * *

UNITED STATES PATENT AND TRADEMARK OFFICE
CERTIFICATE OF CORRECTION

PATENT NO. : 4,690,988

DATED : September 1, 1987

INVENTOR(S) : Hoffman et al.

It is certified that error appears in the above-identified patent and that said Letters Patent is hereby corrected as shown below:

Column 3, line 50, "6-hexadiene" should be -- 1,6-hexadiene --.

Column 6, line 3, "esily" should be --easily --.

Column 6, line 37, "desired" should be -- desired, --.

Column 15, line 3, "aoid" should be -- acid --.

Signed and Sealed this

Twenty-third Day of August, 1988

Attest:

DONALD J. QUIGG

Attesting Officer

Commissioner of Patents and Trademarks